(12) United States Patent
Haines et al.

(10) Patent No.: US 6,826,162 B2
(45) Date of Patent: Nov. 30, 2004

(54) LOCATING AND MAPPING WIRELESS NETWORK DEVICES VIA WIRELESS GATEWAYS

(75) Inventors: Robert E. Haines, Boise, ID (US); Paul L Jeran, Boise, ID (US); Travis J. Parry, Boise, ID (US); Gary L. Holland, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 416 days.

(21) Appl. No.: 09/967,692

(22) Filed: Sep. 28, 2001

(65) Prior Publication Data

US 2003/0063589 A1 Apr. 3, 2003

(51) Int. Cl.[7] .............................. H04Q 7/00; H04Q 7/20; H04Q 7/24
(52) U.S. Cl. ...................... 370/332; 370/338; 370/401; 455/440; 455/456.1
(58) Field of Search .................................... 370/331, 332, 370/338, 401; 455/440, 513, 457, 456.3, 456.1; 342/457, 451, 419, 357.02, 450; 396/310

(56) References Cited

U.S. PATENT DOCUMENTS

| | | | |
|---|---|---|---|
| 4,494,119 A | * | 1/1985 | Wimbush .................... 342/457 |
| 4,644,532 A | | 2/1987 | George et al. |
| 4,825,206 A | | 4/1989 | Brice, Jr. et al. |
| 4,914,571 A | | 4/1990 | Baratz et al. |
| 5,055,851 A | * | 10/1991 | Sheffer ........................ 342/457 |
| 5,185,860 A | | 2/1993 | Wu |
| 5,208,756 A | * | 5/1993 | Song ........................ 455/456.3 |
| 5,276,789 A | | 1/1994 | Besaw et al. |
| 5,293,635 A | | 3/1994 | Faulk, Jr. et al. |
| 5,297,138 A | | 3/1994 | Black |
| 5,394,158 A | * | 2/1995 | Chia ........................... 455/440 |
| 5,421,024 A | | 5/1995 | Faulk, Jr. et al. |
| 5,450,408 A | | 9/1995 | Phaal |
| 5,458,123 A | | 10/1995 | Unger |
| 5,481,674 A | | 1/1996 | Mahavadi |
| 5,548,583 A | | 8/1996 | Bustamante |
| 5,548,722 A | | 8/1996 | Jalalian et al. |
| 5,594,731 A | | 1/1997 | Reissner |
| 5,611,050 A | | 3/1997 | Theimer et al. |
| 5,613,205 A | * | 3/1997 | Dufour ........................ 455/440 |
| 5,659,596 A | | 8/1997 | Dunn |
| 5,666,662 A | * | 9/1997 | Shibuya ....................... 342/457 |
| 5,684,959 A | | 11/1997 | Bhat et al. |
| 5,687,320 A | | 11/1997 | Wiley et al. |
| 5,732,354 A | * | 3/1998 | MacDonald ................. 342/451 |
| 5,790,536 A | | 8/1998 | Mahany et al. |
| 5,793,975 A | | 8/1998 | Zeldin |
| 5,812,865 A | | 9/1998 | Theimer et al. |

(List continued on next page.)

FOREIGN PATENT DOCUMENTS

| | | | | |
|---|---|---|---|---|
| EP | 800319 | * | 8/1997 | ............ H04Q/7/22 |
| JP | 411298946a | * | 10/1999 | ............ H04Q/7/34 |

*Primary Examiner*—Duc Ho
*Assistant Examiner*—Phuongchau Ba Nguyen

(57) ABSTRACT

Methods and apparatus for locating a network device relative to other network devices are useful for the management of wireless computing networks. Signal strength in a wireless network is indicative of a distance between a transmitting device and a receiving device. Through use of triangulation of the received signals at multiple receiving devices, the relative location of the transmitting device can be determined. Methods of refining the estimation of the expected location of the transmitting device are further provided. Defining an absolute location for at least one of the devices will permit determining the absolute location of the remaining devices based on these relative locations. Locating network devices relative to each other facilitates identifying a closest available resource within the network.

20 Claims, 7 Drawing Sheets

U.S. PATENT DOCUMENTS

| | | |
|---|---|---|
| 5,862,404 A | 1/1999 | Onaga |
| 5,920,698 A | 7/1999 | Ben-Michael et al. |
| 5,942,984 A | 8/1999 | Toms et al. |
| 6,003,074 A | 12/1999 | Vasconcellos |
| 6,038,600 A | 3/2000 | Faulk, Jr. et al. |
| 6,061,505 A | 5/2000 | Pitchaikani et al. |
| 6,067,093 A | 5/2000 | Grau et al. |
| 6,084,867 A | 7/2000 | Meier |
| 6,108,702 A | 8/2000 | Wood |
| 6,134,448 A * | 10/2000 | Shoji et al. ............... 342/450 |
| 6,148,211 A * | 11/2000 | Reed et al. ............... 455/456.2 |
| 6,151,624 A | 11/2000 | Teare et al. |
| 6,151,631 A | 11/2000 | Ansell et al. |
| 6,201,611 B1 | 3/2001 | Carter et al. |
| 6,216,087 B1 | 4/2001 | Want et al. |
| 6,512,752 B1 * | 1/2003 | H'mimy et al. ............. 455/513 |
| 6,657,549 B1 * | 12/2003 | Avery ........................ 342/419 |
| 2002/0034384 A1 * | 3/2002 | Mikhail ...................... 396/310 |
| 2002/0175855 A1 * | 11/2002 | Richton et al. ........ 342/357.02 |

* cited by examiner

LOCATING AND MAPPING WIRELESS NETWORK DEVICES VIA WIRELESS GATEWAYS

TECHNICAL FIELD OF THE INVENTION

The present invention relates generally to locating and mapping network devices in a wireless network, and in particular to facilitating the discovery of a nearest network device via received signal strength at a wireless gateway.

BACKGROUND OF THE INVENTION

As networks of computing devices and peripherals become more complex and dynamic, it becomes increasingly important for the network structure to be flexible and to be easily updated. To address this challenge, wireless networks have become increasingly popular. Because device additions to a wireless network do not require the addition or rerouting of physical cabling, they are generally more flexible and easily updated than are wired networks. Wireless networks further have the advantage of being able to accommodate transient or mobile users.

One dilemma a network user may face is determining the physical location of a computer peripheral or other network device. As an example, a wireless network user may want to print out a color document from their palmtop computer. The user may want to locate a nearby color printer. While the operating system may be able to provide a list of suitable imaging devices along with textual descriptions of their location, this may not be helpful to the user if they are unfamiliar with the building or complex where the network is located.

For the reasons stated above, and for other reasons stated below that will become apparent to those skilled in the art upon reading and understanding the present specification, there is a need in the art for alternative methods for determining the location of a wireless network device.

SUMMARY

Methods and apparatus for locating a network device relative to other network devices in a wireless network are described herein. Signal strength in a wireless network is indicative of a distance between a transmitting device and a receiving device. Through use of triangulation of the received signals at one or more receiving devices, the relative location of the transmitting device can be determined. Methods of refining the estimation of the expected location of the transmitting device are further provided. Defining an absolute location for at least one of the devices will permit determining the absolute location of the remaining devices based on these relative locations.

For one embodiment, the invention provides a method of mapping a wireless network having one or more wireless gateways and one or more other network devices. Each wireless gateway is adapted for communication with at least one of the other wireless network devices. The method includes, for each of the other wireless network devices, determining an estimated distance of that other wireless network device from one or more of the wireless gateways based on a received signal strength between that other wireless network device and each of the respective wireless gateways. The method further includes, for each of the other wireless network devices, determining an expected location of that other wireless network device based on the estimated distance of that other wireless network device from the wireless gateways. The expected location is relative to a first network device, such as one of the wireless gateways or one of the other network devices.

For another embodiment, the invention provides a method of locating, in a wireless network, a nearest wireless network device matching a criteria. The method includes determining expected locations of wireless network devices relative to one another based on a signal strength received between each of the wireless network devices and one or more wireless gateways. The wireless network devices and the wireless gateways are part of the wireless network. The method further includes generating a data structure containing the expected locations associated with each of the wireless network devices. The data structure includes supplemental information associated with each of the wireless network devices. The method still further includes searching the data structure for each wireless network device matching the criteria, criteria being compared to at least the supplemental information. The method still further includes identifying each wireless network device matching the criteria and identifying the wireless network device matching the criteria that is nearest a reference point.

For yet another embodiment, the invention provides a computer-usable medium having computer-readable instructions stored thereon capable of causing a processor to perform a method. The method includes determining an estimated distance of one or more first network devices from a second network device based on a strength of a signal received between the one or more first network devices and the second network device. The method further includes determining an estimated distance of the one or more first network devices from a third network device based on a strength of a signal received between the one or more first network devices and the third network device. The method still further includes determining an estimated distance of the one or more first network devices from a fourth network device based on a strength of a signal received between the one or more first network devices and the fourth network device. The method still further includes determining an expected location of each of the first network devices relative to each other based at least on the estimated distances of the first network devices from the second, third and fourth network devices.

Further embodiments of the invention include apparatus and methods of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
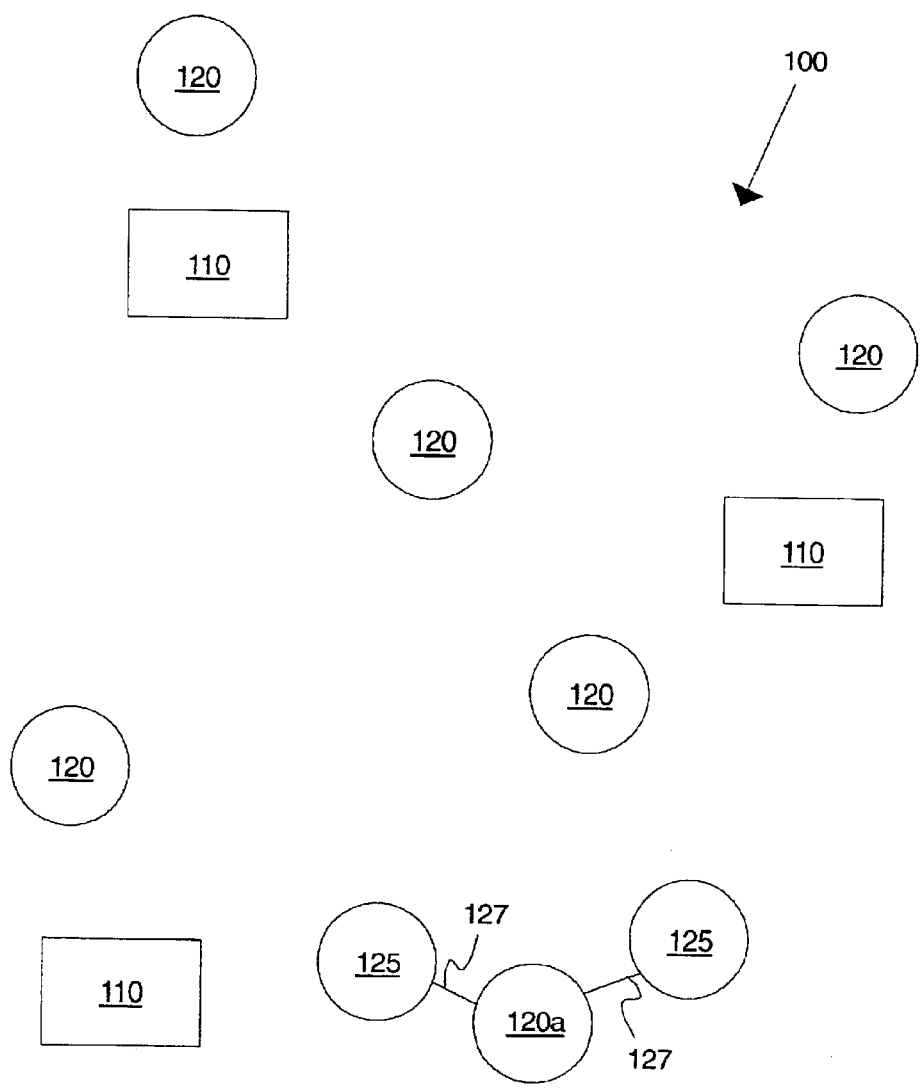
FIG. 1 is a schematic of a typical wireless network containing one or more wireless gateways and one or more other network devices.

The various embodiments provide methods of determining an expected location of a network device based on a signal strength of the network device received at one or more wireless gateways or base stations of a wireless network. These gateways are access points to the network for various client devices. FIG. 1 is a schematic of a typical wireless network 100 containing one or more wireless gateways 110 and one or more other network devices 120. The network devices 120 communicate with one or more of the gateways 110 using some form of wireless communication. Wireless communications include radio frequency (RF) communications, infrared (IR) communications, microwave communications and other techniques for communicating between devices without the need for a physical connection. Some examples of the network devices 120 include imaging devices (e.g., printers, facsimile machines, plotters and other devices for producing an image, whether single or multi-function devices), servers, workstations and storage devices (e.g., magnetic tape storage, magnetic disk storage, optical media storage and dynamic or non-volatile memory, whether permanent or removable).

One or more of the wireless network devices 120 may also communicate with wired network devices. As an example, a network device 120a may be a server, bridge, router or other wireless device on the wireless network 100 used to connect one or more wired network devices 125 to the wireless network 100 through physical wired connections 127. As an example, the network device 120a could be a computer workstation coupled to two imaging devices, such as a local laser printer and a local color printer. The wired connections 127 may be such physical connections as a parallel port connection to the workstation, a serial port connection to the workstation, a universal serial bus (USB) connection to the workstation and other cabled or direct-wired connections.

On a wired network, it is generally impossible to determine the relative distances between network devices based on information generated by the member network devices. While a time lag or propagation delay between sending and receiving a packet of information can give an indication of how far a signal traveled, the path may not be direct. As an example, two receiving devices could be pinged by a sending device. A propagation delay of one unit of time from the sending device to a first receiving device and three units of time from the sending device to a second receiving device may mean that the path between the sending device and the first receiving device is one-third the length of the path between the sending device and the second receiving device. However, the second receiving device may be located physically closer to the sending device, but merely have a more circuitous path from the sending device than does the first receiving device. Accordingly, the time lag cannot be used to determine relative distance between network devices. A network user may also use the number of router "hops" to determine whether network devices are contained in the same subnetwork, i.e., crossing a router indicates that a device is on a different subnetwork. However, as with propagation delay, a receiving device several subnetworks away may be physically adjacent to the sending device.

Contrarily, in a wireless network 100, data travels from a network device 120 substantially in a straight line to a wireless gateway 110, and vice versa. It is known that signal strength of a wireless transmission is generally inversely proportional to the square of the distance. That is, a received signal strength at distance x from a sending device is approximately $1/x^2$ the strength of the originating signal. Thus, if one knows the strength of the transmitted signal, the distance traveled may be calculated from the received signal strength. While signal strength may be detected and gathered in a variety of manners, wireless network client managers often provide this information as a utility or troubleshooting feature. An example of a client manager providing this information is the ORiNOCO™ Client Manager available from Lucent Technologies, Murray Hill, N.J., USA.

Figure 2:
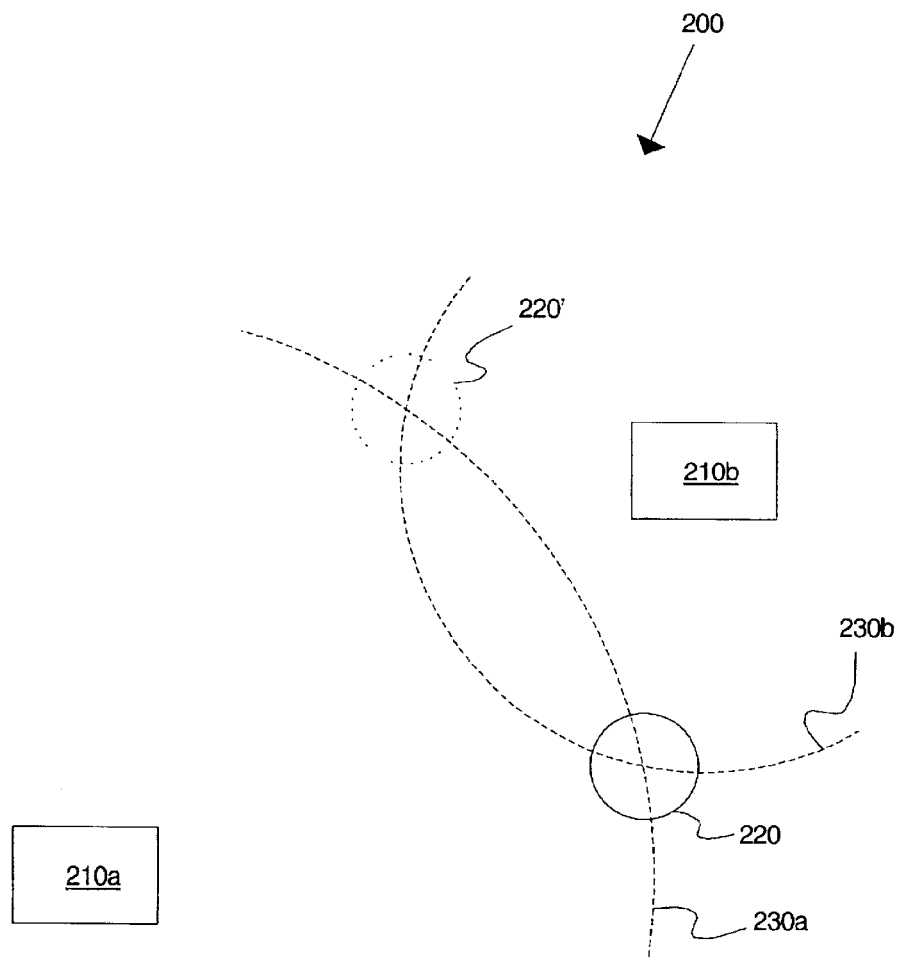
FIG. 2 is a schematic of a wireless network showing curves of estimated distance in accordance with an embodiment of the invention.

FIG. 2 is a schematic of a wireless network 200 containing one or more wireless gateways 210 and one or more other network devices 220. The network device 220 transmits wireless communications that are received by the wireless gateways 210a and 210b. Each wireless gateway 210 detects a signal strength associated with the wireless transmission received from the network device 220. Based on the detected signal strength, an estimated distance is determined between the transmitting device, e.g., network device 220, and the receiving device, e.g., a wireless gateway 210. While the discussion will focus on a network device 220 as a transmitting device and wireless gateways 210 as the receiving devices, each device type can act as either a transmitting device or a receiving device. Thus, while it is preferred to gather distance information using the wireless gateways 210 as the receiving devices, it is similarly possible to gather the distance information using the other network devices 220 as the receiving devices as the estimated distance is determined from a signal strength received between a transmitting device and a receiving device regardless of what type of device is acting as the receiving device.

The estimated distance can be represented mathematically as some form of closed curve such that the transmitting device is expected to be at some point on the curve surrounding the receiving device. For an omni-directional receiver, the closed curve would be circular in a two-dimensional system and spherical in a three-dimensional system. For purposes herein, a two-dimensional system implies that the receiving devices and the transmitting device all reside in substantially the same plane, such as a floor of an office building. Similarly, a three-dimensional system implies that the receiving devices and the transmitting device reside in different planes, such as multiple floors of the office building.

An example of a two-dimensional system using omni-directional receivers is shown in FIG. 2 with the arcs 230a and 230b representing portions of the closed curves associated with the wireless gateways 210a and 210b, respectively. For directional receivers, the shapes of the closed curves can be determined from the characteristics of the receivers. For example, a cardioid receiver may result in a curve of the estimated distance that is generally heart-shaped. The various embodiments will be described using the assumption of an omni-directional receiver, but the extension to more complex curves involves merely the substitution of the appropriate equation for the estimated distance. However, an additional advantage to using omni-directional receivers is that the curves of estimated distance may be drawn around either the receiving device or the transmitting device. That is, the arcs 230a and 230b could be generated from signal strength information for transmissions between the network device 220 and the wireless gateways 210a and 210b, whether the transmissions are received by the network device 220 from the wireless gateways 210a and 210b or received by the wireless gateways 210a and 210b from the network device 220.

The network device 220 is expected to be located at an intersection of the arcs 230a and 230b. However, in a two-dimensional system, the arcs 230a and 230b may intersect at two positions such that the transmitting device, in this case network device 220, is expected to be either at its true location or at a phantom location 220'. Where there is more than one solution to the intersection of the curves of estimated distance, the estimated location of the transmitting device could be given either as a single point, such as a point equidistant between the two solutions, or as multiple points, such as the set of points defining a line extending between the two solutions.

The situation for curves that are superimposed, i.e., curves that intersect at each of their points, is ignored. As a practical matter, such situations would only occur where the respective receiving devices are co-located. Furthermore, it should be apparent that in a three-dimensional system, two closed curves, e.g., two spheres, may intersect at more than two points. For example, the intersection of two spheres may be a circle. For this three-dimensional characterization, one additional receiving device is necessary to reduce the possible expected locations to two points.

Figure 3:
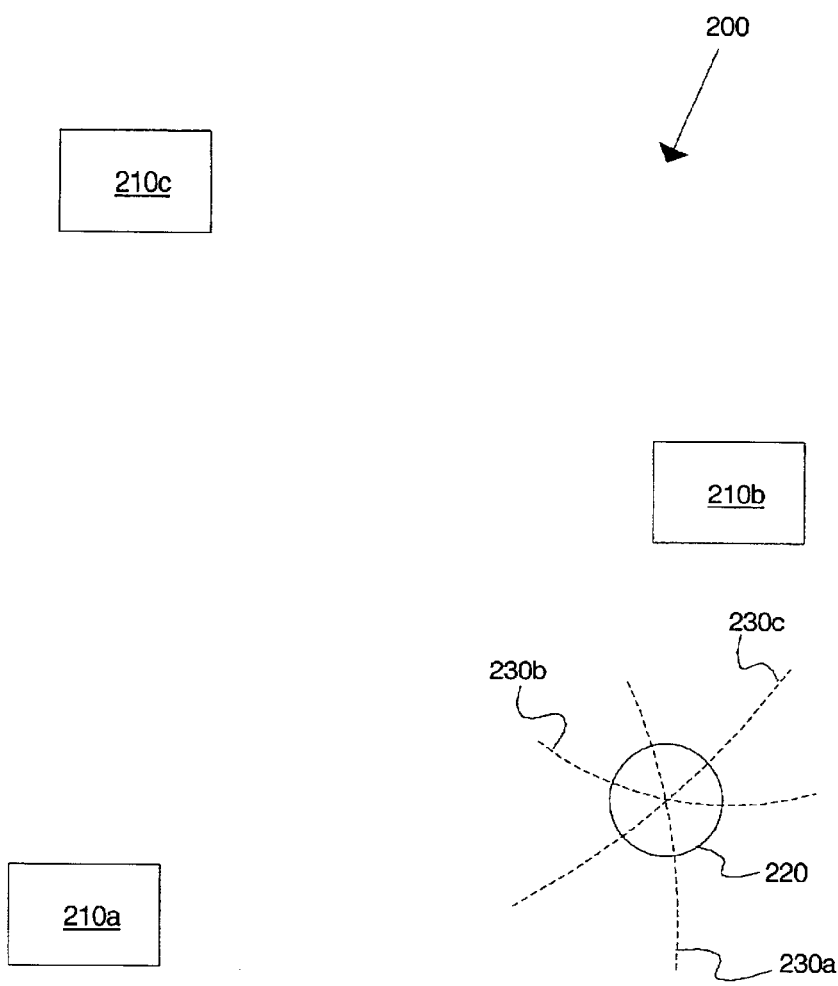
FIG. 3 is a schematic of the wireless network showing curves of estimated distance in accordance with another embodiment of the invention.

FIG. 3 is a schematic of the wireless network 200 having a wireless gateway 210c as an additional receiving device. Based on the received signal strength from the network device 220, a third arc 230c may be generated as an expected distance between the network device 220 and the wireless gateway 210c. For the two-dimensional characterization, having three receiving devices facilitates elimination of the phantom location and identification of the expected actual location of the network device 220. As noted above, for a three-dimensional characterization, one additional receiving device is necessary to reduce the possible expected locations to one point.

It is noted that a signal from a transmitting device may be received by more receiving devices than are necessary to uniquely determine an expected location of the transmitting device. For example, in a two-dimensional system, a signal from a network device 220 may be received by four or more wireless gateways. In such situations, it is preferable to choose the three strongest signals as these would be presumed to produce the lowest level of error in any resulting calculation. However, there is no prohibition to using more receiving devices than are necessary to produce a solution, nor is there a prohibition to using receiving devices other than the devices receiving the strongest signal levels.

The foregoing description demonstrates the theoretical basis for the determination of a location of a transmitting device in a wireless network. However, it is recognized that the arcs 230a, 230b and 230c may not intersect at a common point, e.g., the actual location of the network device 220.

Figure 4:
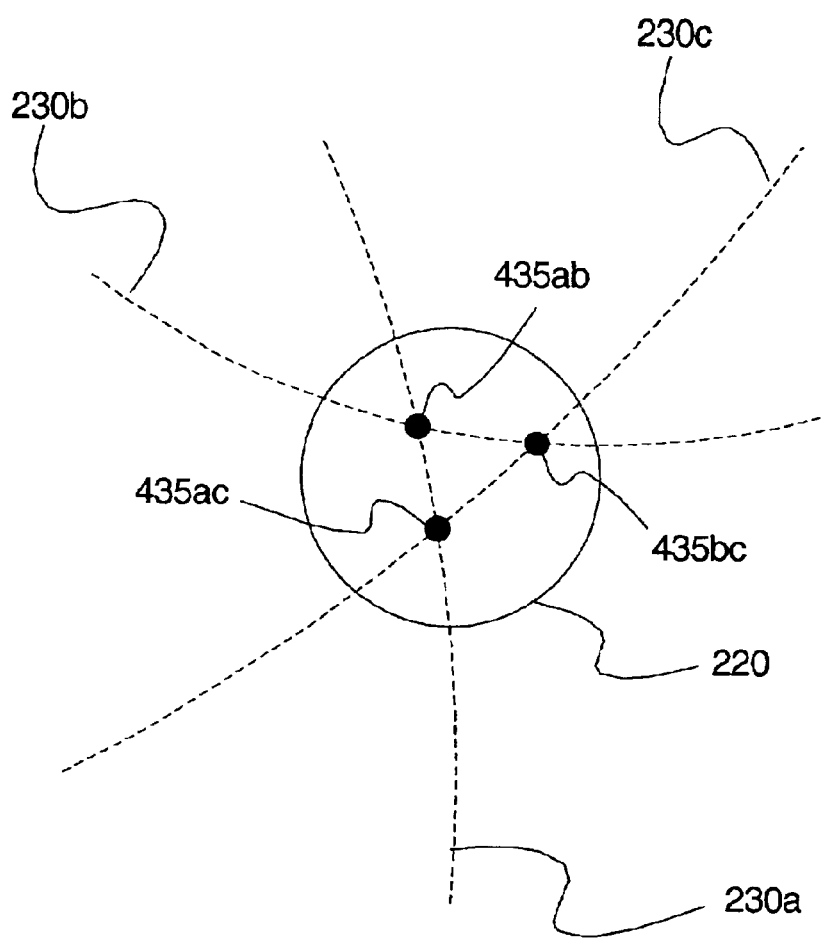
FIG. 4 depicts the intersection of portions of the curves of estimated distance of a network device from a trio of wireless gateways in accordance with an embodiment of the invention.

FIG. 4 depicts the intersection of portions of the curves of estimated distance of the network device 220 from a trio of wireless gateways. As shown in FIG. 4, arcs 230a and 230b may intersect at 435ab, arcs 230a and 230c may intersect at point 435ac and arcs 230b and 230c may intersect at point 435bc. These three closest points of intersection (there are three additional points of intersection outside the extent of the figure) may still be used to generate the expected location of the network device 220. The location of the network device 220 may be estimated as an average of the closest points of intersection, e.g., a point equidistant from each of the points of intersection. For another embodiment, the location of the network device 220 may be estimated to be a weighted average of the closest points of intersection, e.g., the points of intersection could be weighted based on the received signal strength, with more weight being given to the points of intersection having the highest received signal strength. Stronger signal strengths can be presumed to generate more accurate estimations of expected distance, so the actual location can be expected to be closer to the point of intersection of the two curves having the smallest radii, area or volume. Further refinement, describe later, may be desired if the area defined by the closest points of intersection is above some threshold level.

Figure 5:
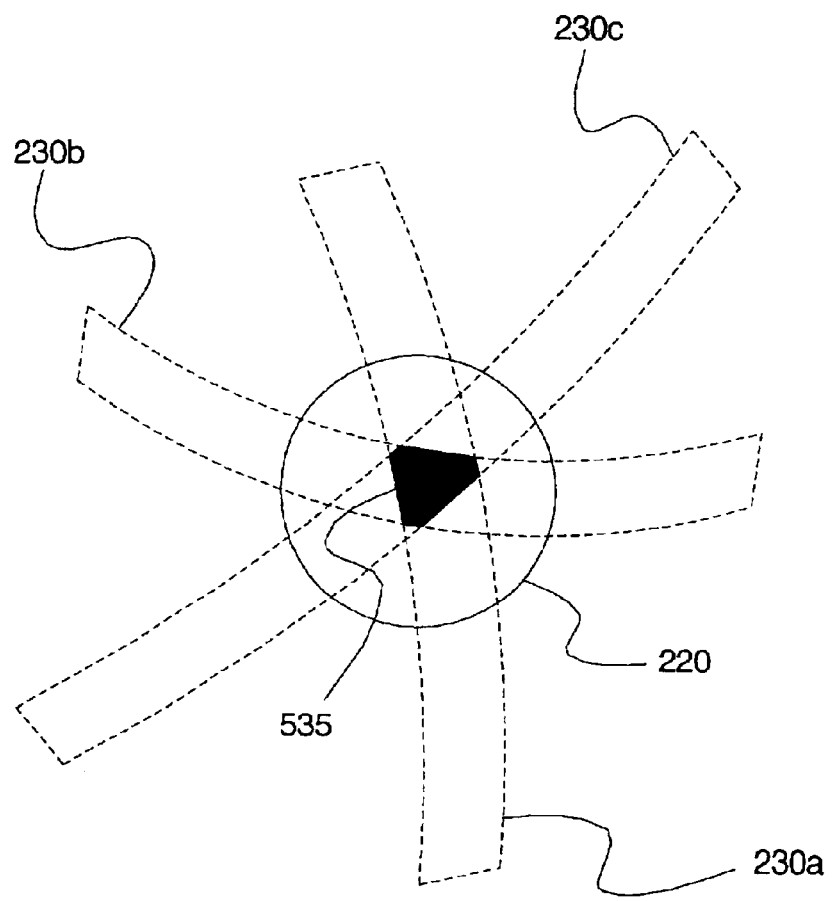
FIG. 5 depicts the intersection of portions of the curves of estimated distance of a network device from a trio of wireless gateways using ranges of estimated distance in accordance with an embodiment of the invention.

FIG. 5 depicts the intersection of portions of the curves of estimated distance of the network device 220 from a trio of wireless gateways using ranges of estimated distance. To reduce the likelihood that curves will not have a common point of intersection, the curves of estimated distance may be given as ranges of distance such that the expected location of the network device 220 is between some minimum distance and some maximum distance for each receiving device. The maximum and minimum distances may be based on a calculated distance plus or minus an expected error of the calculation. The expected location of the network device 220 in this scenario is the intersection 535 of the three bands of the arcs 230a, 230b and 230c. The expected location can be given as a single point, such as a center point of the intersection 535, or as multiple points, such as the set of points making up the intersection 535.

Figure 6A:
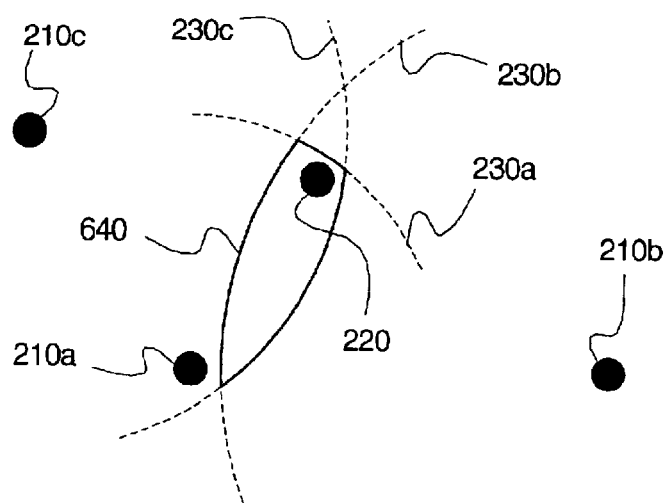
FIGS. 6A–6B depict the intersection of portions of the curves of estimated distance of a network device from a trio of wireless gateways in accordance with embodiments of the invention.
Figure 6B:
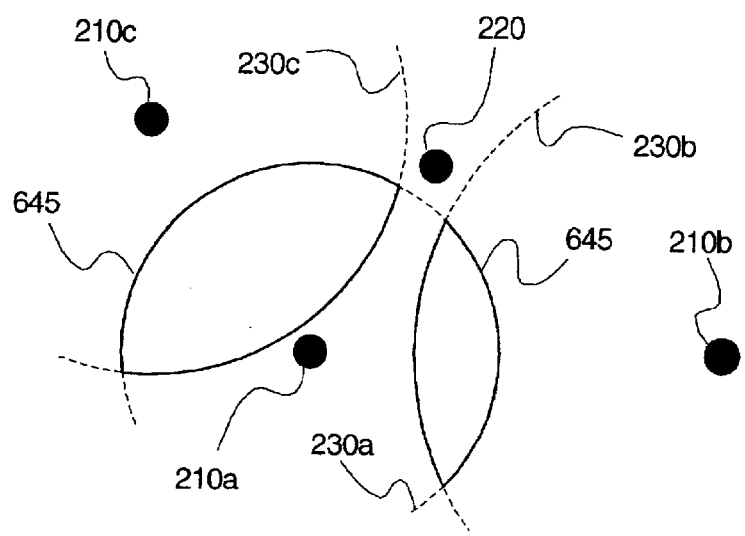

FIGS. 6A and 6B are used to describe additional methods of accommodating instances where the intersection of the curves of expected distance do not uniquely define a point of expected location of the network device 220. In FIG. 6A, the estimated distance curves 230a, 230b and 230c are generated in response to the signal strength received at the wireless gateways 210a, 210b and 210c, respectively, from the network device 220. Each of the arcs 230a, 230b and 230c overestimates the distance between its respective receiving device and the transmitting device. This can be caused by having a transmitted signal strength from the network device 220 that is lower than expected. Instead of generating the expected location of the network device 220 from the closest points of intersection, as described with reference to FIG. 4, the expected location of the network device 220 can be based alternatively on the common area of overlap 640. This area of overlap 640 is that portion of space contained within each of the curves of estimated distance. A threshold level can be defined, based on a desired level of accuracy, to determine whether further refinement is necessary. For example, it may be desirable to define an expected location of a network device 220 to be an area of no more than 100 square feet. For this example, if the common area of overlap 640 is less than or equal to 100 square feet, no further refinement is necessary.

If it is desired to further refine the estimate of expected location of the network device 220, e.g., the size of the area of overlap 640 is above some predefined threshold, ranges of distance can be used as described with reference to FIG. 5 in an attempt to produce a common point of intersection. Alternatively, or in addition, a gain factor can be employed to adjust each of the curves of estimated distance. In the instance where there is a common area of overlap 640, but no common point of intersection, the received signals at each of the receiving devices could be multiplied by some gain factor greater than one to generate revised curves having lower estimated distances, thereby reducing the size of the common area of overlap 640. Alternatively, the estimated distances could each be multiplied by some positive gain factor less than one to generate the revised curves. This process can be repeated until the common area of overlap 640 has a size that is below the threshold.

In FIG. 6B, the estimated distance curves 230a, 230b and 230c are generated in response to the signal strength received at the wireless gateways 210a, 210b and 210c, respectively, from the network device 220. Each of the arcs 230a, 230b and 230c underestimates the distance between its respective receiving device and the transmitting device. This can be caused by having a transmitted signal strength from the network device 220 that is higher than expected. In a situation as shown and described with reference to FIG. 4, the three closest points of intersection can be used to generate the expected location of the network device 220. However, as shown in FIG. 6B, two of the arcs 230 may not intersect at any point. While there are areas of overlap 645 between arc 230a and 230b and between arc 230a and 230c, there is no area of overlap between arc 230b and 230c, nor is there any area of overlap common to all of the curves. It is possible to generate the expected location of the network device 220 from the two closest points of intersection, such as a midpoint of a line drawn through the closest points of intersection. Alternatively, the received signals at each of the receiving devices could be multiplied by some positive gain factor less than one to generate revised curves having higher estimated distances or the estimated distances could each be multiplied by some gain factor greater than one to generate the revised curves. This process can be repeated until there is a common point of intersection or the closest points of intersection for each of the curves generate an area falling below the threshold level.

It is also conceivable that the transmitting device will be so close to the receiving device that the received signal will be saturated. In such circumstances, the received signal can be attenuated for the purposes of detecting distance. Of course the estimated distance must be correspondingly adjusted downward, such as by the square root of the attenuation. For example, if the received signal is attenuated using a gain factor of 0.8 and an omni-directional receiver, the distance estimated from this attenuated signal might be multiplied by the square root of 0.8 for use in estimating the expected location of the transmitting device.

The methods of the various embodiments are suited to be performed by computer processors in response to instructions in either software, firmware or hardware. These computer-readable instructions are stored on a computer-usable medium and are adapted to cause the processor to perform the methods. In a hardware solution, the instructions are hard coded as part of a processor, e.g., an application-specific integrated circuit (ASIC) chip, to perform the methods of one or more of the embodiments. In a software or firmware solution, the instructions are stored for retrieval by the processor. Some additional examples of computer-usable media include static or dynamic random access memory (SRAM or DRAM), read-only memory (ROM), electrically-erasable programmable ROM (EEPROM), magnetic media and optical media, whether permanent or removable.

The methods may be performed on a continuous basis, or more preferably, on a periodic, user-initiated or event-driven basis. As one example, the methods may be performed daily or hourly to generate expected locations of the devices within the network. As another example, the methods may be performed in response to a user query for location information. As a further example, the methods may be performed in response to events such as new devices being added to the network, existing devices being removed from the network, a start-up of a network device, etc.

The location information may be collected and processed in a central location for use by any network device. For example, a network server or workstation hosting a network client manager may be responsible for generating and storing location information to be accessed by client devices within the network. Alternatively, the location information may be collected and processed at a device initiating the collection procedure. For example, a mobile user may query devices within its transmission range to collect signal strength information. The mobile user's device, such as a handheld computer, can then generate the expected locations for the network devices relative to the mobile user.

Figure 7:
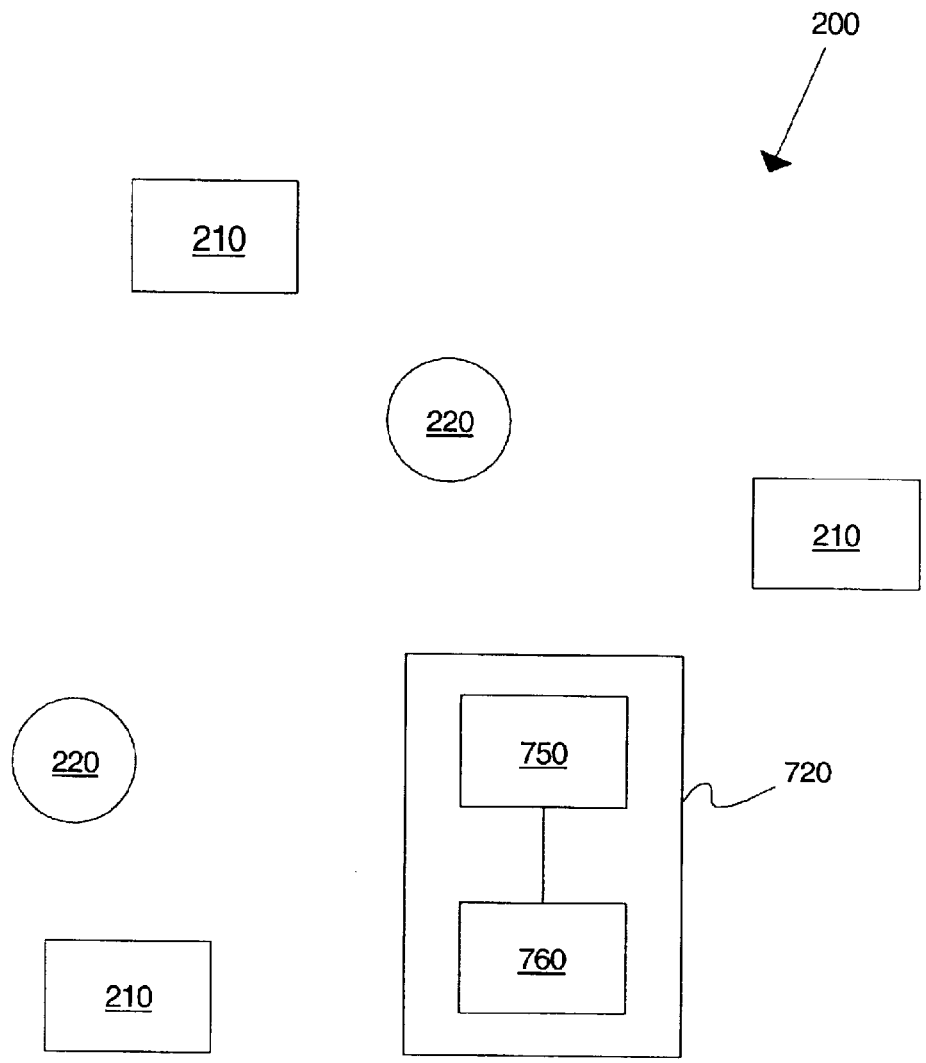
FIG. 7 is a schematic of a wireless network having at least one network device in accordance with an embodiment of the invention.

FIG. 7 is a schematic of a wireless network 200 having one or more wireless gateways 210 and one or more wireless network devices 220 and 720. Network device 720 may be any wireless network device, including a wireless gateway. Furthermore, the wireless network 200 may have one or more wired network devices (not shown in FIG. 7) coupled to one or more of its wireless network devices.

The network device 720 includes a processor 750 and a computer-usable medium 760. The computer-usable medium 760 includes instructions adapted to cause the processor 750 to perform a method in accordance with an embodiment of the invention. Such methods may further include gathering information from one or more of the wireless gateways 210 on the received signals for generation of the curves of estimated distance. The processor 750 may further be adapted to store the signal information on the computer-usable medium 760 as a central repository. It is noted that the computer-usable medium 760 may contain more than one type of media. For example, the computer-readable instructions may be stored on a nonvolatile EEPROM memory device while the signal information is stored on a volatile DRAM memory device. Alternatively, one type of media may serve both storage functions. For example, the computer-readable instructions and the signal information may both be stored on non-removable magnetic disk storage drive. More than one network device of the wireless network 200 may be adapted to perform the methods described herein.

Each wireless network device in communication with a wireless gateway, including other wireless gateways, may be located relative to one another by repeating the process of locating network devices. Building a database, a table or some other data structure based on this relative location data permits identification of a nearest device relative to any reference point, such as a mapping coordinate or some network device. This data structure can further contain supplemental information such as device type, device capabilities, device status, etc. As an example of use for such a data structure, a network user may be looking for the nearest color printer that is on-line and contains photo-quality print media. The user can perform a query, a look-up function or some other search on the data structure to identify the devices meeting these criteria. The criteria may be compared only to the supplemental information, identifying or excluding devices having certain features, options, characteristics, status, performance, consumables, etc. Alternatively, the criteria may further be compared to the location information. As such, the criteria may be designed to exclude network devices that are in certain areas of the network, e.g., areas where a user lacks authorization, or within certain ranges from the reference point. Upon identifying those devices matching the criteria, the location information may be used to identify that device matching the criteria that is nearest the reference point.

Knowledge of an absolute location of one of the devices will further permit mapping of the wireless network such as by Cartesian coordinates, latitude/longitude or other coordinate system. As one example, the absolute location of one or more devices could be entered into the data structure and the remaining locations calculated based on its position relative to one of the absolute locations. These absolute locations could be superimposed on a map of the facilities housing the network, such as an office map, to show the location of the devices in relation to the facilities. The network device requesting the search may be highlighted or otherwise identified on the map to ease location of other network devices relative to the requesting device. In addition to mapping the wireless network devices as described herein, local wired devices may be presumed to be co-located with their associated wireless network devices for purposes of generating the map.

CONCLUSION

Methods and apparatus for locating a network device relative to other network devices in a wireless network are described herein. Signal strength in a wireless network is indicative of a distance between a transmitting device and a receiving device. Through use of triangulation of the received signals at multiple receiving devices, the relative location of the transmitting device can be determined. Methods of refining the estimation of the expected location of the transmitting device are further provided. Defining an absolute location for at least one of the devices will permit determining the absolute location of the remaining devices based on these relative locations.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A method of mapping a wireless network having one or more wireless gateways and one or more other wireless network devices, wherein each wireless gateway is adapted for communication with at least one of the other wireless network devices, the method comprising:

for each of the other wireless network devices, determining an estimated distance of that other wireless network device from one or more of the wireless gateways based on a received signal strength between that other wireless network device and each of the respective wireless gateways;

for each of the other wireless network devices, determining an expected location of that other wireless network device relative to its respective wireless gateways based on the estimated distance of that other wireless network device from its respective wireless gateways; and for each of the wireless network devices, determining an expected location of that other wireless network devices, is relative to a first network device selected from the group consisting of the one or more wireless gateways and the one or more other wireless network devices, wherein determining the expected location of that other wireless network device relative to the first network device is based at least in part on the expected location of that other wireless network device relative to its respective wireless gateways.

2. The method of claim 1, wherein determining an expected location of that other wireless network device relative to its respective wireless gateways further comprises generating curves of the estimated distances and evaluating an intersection of the curves.

3. The method of claim 2, wherein evaluating the intersection of the curves further comprises determining a common point of intersection of the curves.

4. The method of claim 2, wherein generating the curves of the estimated distances further comprises generating the curves having a range of estimated distances.

5. The method of claim 1, wherein determining an expected location of that other wireless network device relative to its respective wireless gateways further comprises:

generating curves of the estimated distances for that other wireless network device;

evaluating an intersection of the curves;

determining that the curves of the estimated distances do not define a common area of overlap; and revising the curves of the estimated distances by applying a positive gain factor less than one to each of the signal strengths used to generate the curves of the estimated distances.

6. The method of claim 1, wherein determining an expected location of that other wireless network device relative to its respective wireless gateways further comprises:

generating curves of the estimated distances for that other wireless network device;

evaluating an intersection of the curves;

determining that a first expected location of that other wireless network device has a size above a predetermined threshold; and revising the curves of the estimated distances to reduce the size of the expected location of that other wireless network device to a size at or below the predetermined threshold.

7. The method of claim 6, wherein revising the curves of the estimated distances further comprises applying a gain factor to each of the signal strengths used to generate the curves of the estimated distances.

8. The method of claim 7, wherein applying a gain factor further comprises applying a gain factor selected from the group consisting of a positive gain factor less than one and a gain factor greater than one.

9. The method of claim 6, wherein the first expected location is defined by a common area of overlap of the curves of the estimated distances.

10. The method of claim 6, wherein the first expected location is defined by a set of closest points of intersection of the curves of the estimated distances.

11. The method of claim 1, wherein determining an expected location of that other wireless network device relative to its respective wireless gateways further comprises:

generating curves of the estimated distances for that other wireless network device;

evaluating an intersection of the curves;

determining that a first expected location of that other wireless network device has a size at or below a predetermined threshold; and determining the expected location as a point within the first expected location.

12. The method of claim 11, wherein the point within the first expected location is an average of a set of closest points of intersection of the curves.

13. The method of claim 12, wherein the average of the set of closest points of intersection is a weighted average of the set of closest points of intersection.

14. A method of locating, in a wireless network, a nearest wireless network device matching a criteria, the method comprising:

determining expected locations of a plurality of wireless network devices relative to one another based at least in part on a signal strength received between each of the plurality of wireless network devices and one or more wireless gateways, wherein the plurality of wireless network devices and the one or more wireless gateways are part of the wireless network;

generating a data structure containing the expected locations associated with each of the plurality of wireless network devices, wherein the data structure further comprises supplemental information associated with each of the plurality of wireless network devices;

searching the data structure for each wireless network device matching the criteria, wherein the criteria is compared to at least the supplemental information;

identifying each wireless network device matching the criteria; and identifying the wireless network device matching the criteria that is nearest a reference point.

15. The method of claim 14, wherein the reference point is selected from the group consisting of a mapping coordinate and one of the wireless network devices.

16. The method of claim 14, wherein the criteria is further compared to the expected locations.

17. A computer-usable medium having computer-readable instructions stored thereon capable of causing a processor to perform a method, the method comprising:

determining an estimated distance of one or more first network devices from a second network device based on a strength of a signal received between the one or more first network devices and the second network device;

determining an estimated distance of the one or more first network devices from a third network device based on a strength of a signal received between the one or more first network devices and the third network device;

determining an estimated distance of the one or more first network devices from a fourth network device based on a strength of a signal received between the one or more first network devices and the fourth network device;

determining an expected location of each of the first network devices relative to the second, third and fourth network devices based on the estimated distances of the first network devices from the second, third and fourth network devices; and determining an expected location of each of the first network devices relative to each other based at least on the expected location of each of the first network devices relative to the second, third and fourth network devices.

18. The computer-usable medium of claim 17, wherein the method further comprises:

gathering information regarding the strength of the signals received between the one or more first network devices and the second, third and fourth network devices; and placing the information in a location selected from the group consisting of a central repository available to the first network devices, and a first network device making a query for determining an expected location of each of the first network devices relative to each other.

19. The computer-usable medium of claim 17, wherein the method further comprises:

associating expected location information with each of the first network devices in a data structure, wherein the data structure further includes supplemental information concerning the first network devices; and identifying each first network device that matches a criteria, wherein the criteria is compared to at least the supplemental information.

20. The computer-usable medium of claim 19, wherein the method further comprises:

identifying the first network device matching the criteria that is nearest a reference point.

* * * * *

UNITED STATES PATENT AND TRADEMARK OFFICE
CERTIFICATE OF CORRECTION

PATENT NO. : 6,826,162 B2
DATED : November 30, 2004
INVENTOR(S) : Robert E. Haines et al.

It is certified that error appears in the above-identified patent and that said Letters Patent is hereby corrected as shown below:

Column 10,
Line 9, delete "devices,is" and insert therefor -- device --.

Signed and Sealed this

Thirtieth Day of August, 2005

JON W. DUDAS
*Director of the United States Patent and Trademark Office*